United States Patent
van den Berghe

(10) Patent No.: US 9,870,274 B2
(45) Date of Patent: Jan. 16, 2018

(54) METHOD OF EXECUTING A JOB IN A COMPUTER SYSTEM, A RESOURCE MANAGER AND A HIGH PERFORMANCE COMPUTER SYSTEM

(71) Applicant: FUJITSU LIMITED, Kawasaki-shi, Kanagawa (JP)

(72) Inventor: Sven van den Berghe, Marlow (GB)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 14/565,815

(22) Filed: Dec. 10, 2014

(65) Prior Publication Data
US 2015/0169383 A1 Jun. 18, 2015

(30) Foreign Application Priority Data
Dec. 16, 2013 (EP) ..................... 13197559

(51) Int. Cl.
  G06F 9/46 (2006.01)
  G06F 9/50 (2006.01)
  G06F 11/34 (2006.01)
  G06F 9/45 (2006.01)
  G06F 11/30 (2006.01)

(52) U.S. Cl.
CPC ........ G06F 9/5094 (2013.01); G06F 11/3409 (2013.01); *G06F 8/443* (2013.01); *G06F 11/302* (2013.01); *G06F 11/3428* (2013.01); *Y02B 60/142* (2013.01); *Y02B 60/165* (2013.01)

(58) Field of Classification Search
None
See application file for complete search history.

(56) References Cited

U.S. PATENT DOCUMENTS

| 2005/0125701 | A1 | 6/2005 | Hensbergen et al. |
| 2009/0100437 | A1 | 4/2009 | Coskun et al. |
| 2009/0106008 | A1 | 4/2009 | Branson et al. |
| 2012/0216205 | A1 | 8/2012 | Bell, Jr. et al. |

(Continued)

FOREIGN PATENT DOCUMENTS

WO 2015/031064 A1 3/2015

OTHER PUBLICATIONS

Microsoft, Beginners Guide to Performance Profiling, Feb. 5, 2014, MSDN Library.*

(Continued)

*Primary Examiner* — Emerson Puente
*Assistant Examiner* — Steven Do
(74) *Attorney, Agent, or Firm* — Staas & Halsey LLP

(57) ABSTRACT

A method of executing a job in a computer system having a plurality of different allowed configurations comprises: receiving the job; identifying one or more representative samples of the job; executing the one or more representative samples in an experimental phase, the or each representative sample being executed with each different allowed configuration of the computer cluster; collecting execution data including speed of execution and energy used in each configuration during execution of the one or more representative samples and selecting a suitable configuration for the job taking speed of execution and energy use into account; and executing the remainder of the job in a completion phase with the suitable configuration.

16 Claims, 8 Drawing Sheets

(56) References Cited

U.S. PATENT DOCUMENTS

2013/0139170 A1    5/2013  Prabhakar et al.
2014/0317087 A1*  10/2014  Collins ............ G06F 17/30442
                                                    707/715

OTHER PUBLICATIONS

European Communication pursuant to Article 94(3) EPC dated Mar. 11, 2016 in corresponding European Patent Application No. 13 197 559.1.
Chung et al., "A Case Study Using Automatic Performance Tuning for Large-Scale Scientific Programs", 2006 *15th IEEE International Symposium on High Performance Distributed Computing*, 2006, pp. 45-56.
Tiwari et al., "Auto-tuning for Energy Usage in Scientific Applications", *Euro-Par'11 Proceedings of the 2011 International Conference on Parallel Processing*, 2011, 10 pp., vol. 2.
Tiwari et al., "Online Adaptive Code Generation and Tuning", 2011 *IEEE International Parallel & Distributed Processing Symposium (IPDPS)*, May 16-20, 2011, 14 pp.
Götz et al., "Architecture and Mechanisms of Energy Auto-Tuning", *Sustainable ICTs and Management Systems for Green Computing*, 2012, 30 pp.
Extended European Search Report dated Jun. 23, 2014, in corresponding European Patent Application No. 13197559.1.
European Office Action dated Mar. 20, 2017 in European Patent Application No. 13197559.1.
Ananta Tiwari et al., "Auto-tuning full applications: A case study", International Journal of High Performance Computing Applications, originally published online Jun. 29, 2011, 10 pages.

* cited by examiner

METHOD OF EXECUTING A JOB IN A COMPUTER SYSTEM, A RESOURCE MANAGER AND A HIGH PERFORMANCE COMPUTER SYSTEM

CROSS-REFERENCE TO RELATED APPLICATIONS

This application claims the benefit of European Application No. 13197559.1, filed Dec. 16, 2013, in the European Intellectual Property Office, the disclosure of which is incorporated herein by reference.

The present application relates to energy-aware scheduling in a computer system, such as a high-performance computer system (HPC system).

The invention addresses energy consumption in computer systems, for example the amount of energy consumed by programs running on large-scale computer clusters, particularly high performance computing (HPC) systems. HPC clusters consist of a large number of quasi-independent computers (nodes) that are coupled together and may be used to execute one large, monolithic application. Applications (or other jobs) are split into a number of communicating tasks; and these tasks are allocated to nodes by a resource manager.

FIG. 1 is a schematic representation of the parts of an HPC cluster which are relevant to the present invention. The nodes are shown linked by an interconnect and together they form the HPC resource 502. Resource manager 501 controls the cluster and a job such as an application or other task performed by nodes is fed to the resource manager. Incidentally, examples of a node include a core of a processor, a processor, an application specific integrated circuit, a blade or other server or any other quasi-independent computer.

The resource manager is responsible for the efficient running of the HPC system, making sure that resources, including nodes, (and any other resources, which are not shown, in the interests of simplicity) deliver a service to requirements. The over-riding service requirement is generally to complete the application as fast as possible but, since the nodes may be high-end computers and use a lot of energy, a secondary requirement, whose importance is rising, is to use as little energy as possible. The compute nodes have a variety of mechanisms that can be used to reduce the energy but these usually come at the cost of computational performance.

Servers (or nodes) in a cluster are managed collectively by a resource manager. The role of a resource manager is to allocate tasks amongst the servers so that an appropriate quality of service measure is reached e.g. a group of tasks is completed in the shortest time or a particular task finishes by a certain time. Resource managers use sophisticated algorithms and heuristics that rely on knowledge of the availability of resources on the server collection. Resources can include processor time, server memory, network bandwidth or the availability of a software license. Resource managers also ensure that the cluster is used as efficiently as possible. One of the measures of efficiency, particularly for large HPC clusters, is the amount of energy that they use.

Increases to the capability of the microprocessors that form the core of the servers result in increased energy use. However, modern microprocessor designs also have the ability to reduce power consumption when the highest performance is not required. This is achieved through a variety of techniques, such as voltage and frequency scaling or turning off unused sections of a microprocessor. This capability is made available through the operating system to the resource managers so that they can reduce the power consumption of their cluster, but this must be balanced against the need to maintain performance of the applications executing on the cluster.

The overall performance of an application depends on a number of factors. Computational performance is important in many HPC applications, and these are said to be "compute-bound". Some applications are dominated by other factors, such as reading and writing data to memory or communicating data between nodes: these are said to be IO (input-output) bound. The performance of compute-bound applications is adversely affected by placing nodes into energy-saving states, but IO bound applications can have their nodes placed into energy saving states with minimal impact on performance. A resource manager has no way of knowing if an application under its control is compute-bound or IO-bound and so cannot safely place any application into energy-saving mode.

Many resource managers expose the ability to set the energy saving mode of a job to the user of the HPC cluster. This capability is not however always well used since the users may not be motivated to save energy (unless, for example, they are being charged for energy used in addition to other resources used). Also, users will not want to reduce the execution performance of their applications (i.e. they want to minimise the time to solution). Therefore, it is desirable for resource managers to automatically apply energy saving modes where it can be guaranteed that performance will not be affected.

It is desirable to provide energy-aware execution which does not rely on previously submitted jobs.

SUMMARY

According to an embodiment of one aspect of the invention there is provided a method of executing a job in a computer system having a plurality of different allowed configurations, the method comprising: receiving the job; identifying one or more representative samples of the job; executing the one or more representative samples in an experimental phase, the (if there is a single representative sample) or each (if there is more than one) representative sample being executed with each different allowed configuration of the computer cluster; collecting execution data including speed of execution and energy used in each configuration during execution of the one or more representative samples and selecting a suitable configuration for the job taking speed of execution and energy use into account; and executing the remainder of the job in a completion phase with the suitable configuration.

Thus invention embodiments use at least one representative sample of the application or other job which is a part of the job (less than the whole of the job) and whose energy use characteristics correspond to the energy use characteristics of the whole job. The energy use characteristics may be the same (allowing for the different size of the representative sample and the whole job) as those for the whole job, or allowed to differ but be within a specified range, say a 10% or 5% deviation, for example in terms of one or more energy use parameters, such as overall energy use and/or number, duration and size of energy "spikes" etc.

The job is executed in two phases, an experimental phase in which each of maybe between 1-15 representative samples is executed with each of a number of different configurations of the computer system, and a completion phase using a selected configuration. The representative samples will be generally referred to in the plural hereinafter, but the skilled person will appreciate that a single representative sample may be provided, unless inappropriate for the technical requirements of a specific embodiment. Use of a single representative sample is likely to give a quicker result, whereas more samples, particularly if they differ, may allow provision of a more suitable configuration for a complex execution.

Once the or each representative sample has executed with each allowed configuration (or during execution of the samples), a suitable configuration is selected based on the execution data collected including speed of execution and energy use.

Embodiments of the invention allow execution in a suitable configuration, which tends to achieve an energy saving as compared with execution in another of the allowed configurations.

Invention embodiments can allow resource managers or other comparable functionality in a computer system to acquire information about an application's properties when it is submitted so that it can save energy during its execution, preferably without impacting the computational performance. The experimental phase can be carried out each and every time a job is submitted.

The state of the art in "energy-aware" resource managers is represented by US patent applications US 20120216205 and US 20090100437. These publications describe a resource manager functionality with a database of the performance characteristics of previously submitted jobs and a computational model of the effect of placing a cluster into energy saving mode on a job with the given performance characteristics. If the resource manager can identify a job as previously submitted it uses the recorded characteristics to compute the best energy configuration that does not impact performance.

The problem that the prior art does not address is that there is no guarantee that a resubmitted job will have the same performance characteristics as the previous submission. Resource managers cannot know from outside an application what the optimal settings are for energy efficiency. Even though the same application may have been submitted previously there could have been changes invisible to the resource manager that affect the energy use characteristics. These changes include modifications to the code, selection of a different solution algorithm, a different mapping of load to compute nodes, a change to the problem size or a change to enabled options. All of these changes can affect the energy use characteristics of an application and the interaction between configurations and computational performance, so past experience with an application is not a reliable guide to the execution of the current application with the current initialisation files.

HPC embodiments of the invention allow the execution of computer jobs on HPC clusters and other systems in a suitable configuration such as an energy saving mode without necessarily affecting performance. This uses identification of the characteristics of a job submitted to the cluster. The characteristics of HPC jobs are very variable from submission to submission, so using knowledge of previously submitted jobs can be unreliable and according to invention embodiments the characteristics of every job are determined individually on submission.

The representative samples may be determined in any suitable way. In one alternative, the job is received in the form of a sub-job array of the same executable with different inputs and the representative samples are identified as a selection only of the sub-job array. Thus one form of job may be submitted in a large group with different input values for the same executable (executable form of an application or another job). Since only the inputs vary, representative samples may simply be taken as a selection of the input value. For example the or each representative sample may be formed from around 1% of the inputs in the same executable or each representative sample may involve only one set of input values.

In this sub-job array alternative, constructs in the job submission language or job description language (used to tell the computer management system what tasks to execute in what order) may indicate a sub-job array or the submission script can be parsed to identify repeated calls of the same executable. In either case the resource manager or equivalent functionality can carry out the detection.

In a second alternative, the job is received in the form of a linked sequence of repeating interchanging sub-jobs, in which each sub job appears more than once and the representative samples are the initial interchanging sub jobs in the sequence. In this case, the number of representative sample should be at least equal to the number of sub jobs.

Some tasks couple two or more jobs together, the output of one forming the input for the next. The interchanging may be alternation or a different scheme. In these circumstances, the initial sub-jobs in the sequence may be executed to gather information until there is sufficient execution data to carry on with the completion phase. Advantageously, each sub job is an application, and two or more suitable configurations are selected, one for each application.

In this case, the determination of the type of job and thus the type of representative sample can take place from constructs in the job description language such as a looping structure.

In a third alternative, the job is cyclical, the cycles are recognised within the job and one or more cycles of the job are identified as the or each representative sample.

Many applications have a well defined cyclical nature, which may be pre-identified by the programmer or user, inferred by reviewing the job description language or identified during execution.

In a fourth alternative, the job includes the main job and sub jobs in the form of one or more probe versions of the main job with energy use characteristics corresponding to the main job; and the sub jobs are identified as the representative samples executed in the experimental phase, with the main job being executed in the completion phase. Thus the users (who may take a compiled and executable program and input data and parameters, for example using a job description language) or programmers (who may have access to the code for the job and thus be able to identify cycles within the job, for example) can supply short probe versions of a main application to aide configuring the computer system to save energy.

The choice of suitable configuration taking speed of execution and energy use into account may be made in any suitable way.

For example if each configuration of the computer system has different energy use characteristics and affects computational performance differently for the job in questions, a suitable configuration may be a configuration with the lowest energy use and an acceptable time to complete execution.

Alternatively, a tolerance to acceptable increases in execution time for specified savings in energy use may be set, so that the suitable configuration may increase the execution time with respect to a less energy efficient configuration.

The determination of the suitable configuration may take execution data from a default configuration into account for comparison purposes, in addition to or as an alternative to data from execution of the other representative samples and other configurations. The default configuration may be a general pre-set default configuration or dependent on the type of job for example. A configuration may be chosen as soon as there is sufficient execution data to give a suitable configuration (that is the experimental phase and collection of execution data may be carried out in parallel) or the entire set of execution data may be considered.

For all of the alternatives mentioned above, the different configurations may include variations in one or more of the following in the computer cluster: applied voltage, cycle frequency (clock speeds), amount of activated computing resource.

The method may include attempts to identify representative samples to cover any or all of the alternatives above. For example, if the representative samples are pre-identified by the programmer or user, the identification step may be a simple input of the representative samples. If there is no pre-identified set of representative samples, there may be a step of parsing a job description language to identify them. If the previous identification methods are not available or are unsuccessful, the representative samples may be identified during execution.

In one embodiment, representative samples are identified by checking for pre-identification in the job; if this is not successful parsing the job description (or submission) language and if that is still not successful, attempting identification during execution.

Thus advantageously a job description language is parsed when the job is received to identify representative samples from the job description language (if necessary). Additionally or alternatively, the job execution may start before the experimental phase in a default configuration phase, which is used to identify representative samples.

The skilled reader will appreciate from this and the general context that the method steps referred to herein may be carried out in a different order from the order of definition and still produce favourable results.

For the technique to be effective, the representative samples should form a small proportion of the overall application, for example 2% or less of the total job, or more preferably 1% or less of the total job. In any case, the expectation is that the total execution time of the representative samples makes up less than 20% and more preferably less than 10% of the overall execution time.

According to invention embodiments, the experimental phase and the completion phase are performed each time a job is submitted. Preferably, the method further comprises collecting subsequent execution data during the completion phase and returning to the experimental phase if the subsequent execution data indicates that the suitable configuration is no longer appropriate. Alternatively, the execution may return to an adapted experimental phase (for example with interchanging sub jobs only one sub job need re-enter the experimental phase if the other job(s) are still executing with suitable configurations). In other circumstances the execution may change to a default configuration.

The computer system may be a computer cluster or have another structure. In the case of a cluster, the job may consist of at least one application which is split into a number of tasks; and the tasks may be allocated to nodes of the computer cluster by a resource manager.

In an embodiment of a second aspect of the present invention there is provided a resource manager managing computing resources in a computer system to execute computing jobs, wherein the resource manager comprises: a control module arranged to assign jobs to resources and to control operation of the computer system to produce different configurations thereof; an energy optimiser arranged to identify representative samples of the job, store the different configurations of the computer system, and to request the control module to assign the job to resources in the computer system to allow execution of the representative samples in an experimental phase, each representative sample being executed with each different configuration of the computer system; and a monitoring module arranged to collect execution data including speed of execution and energy used in each configuration during execution of the representative samples; wherein the energy optimiser is arranged to select a suitable configuration for the job taking speed of execution and energy use into account; and to request the control module to execute the remainder of the application in a completion phase with the suitable configuration.

In an embodiment of a further aspect of the present invention there is provided a high-performance computer system comprising nodes or servers coupled together by an interconnect to form a cluster and a resource manager as described above.

These aspects of the invention may include individual features and sub-features of the method aspect set out in more detail above. Thus the preferred method features set out hereinbefore may be applied to the resource manager in terms of enhanced functionality of the energy optimiser or the resource manager in general.

The resource manager itself may be implemented in software, hardware, middleware, as an application specific integrated circuit (ASIC) or in any other form.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
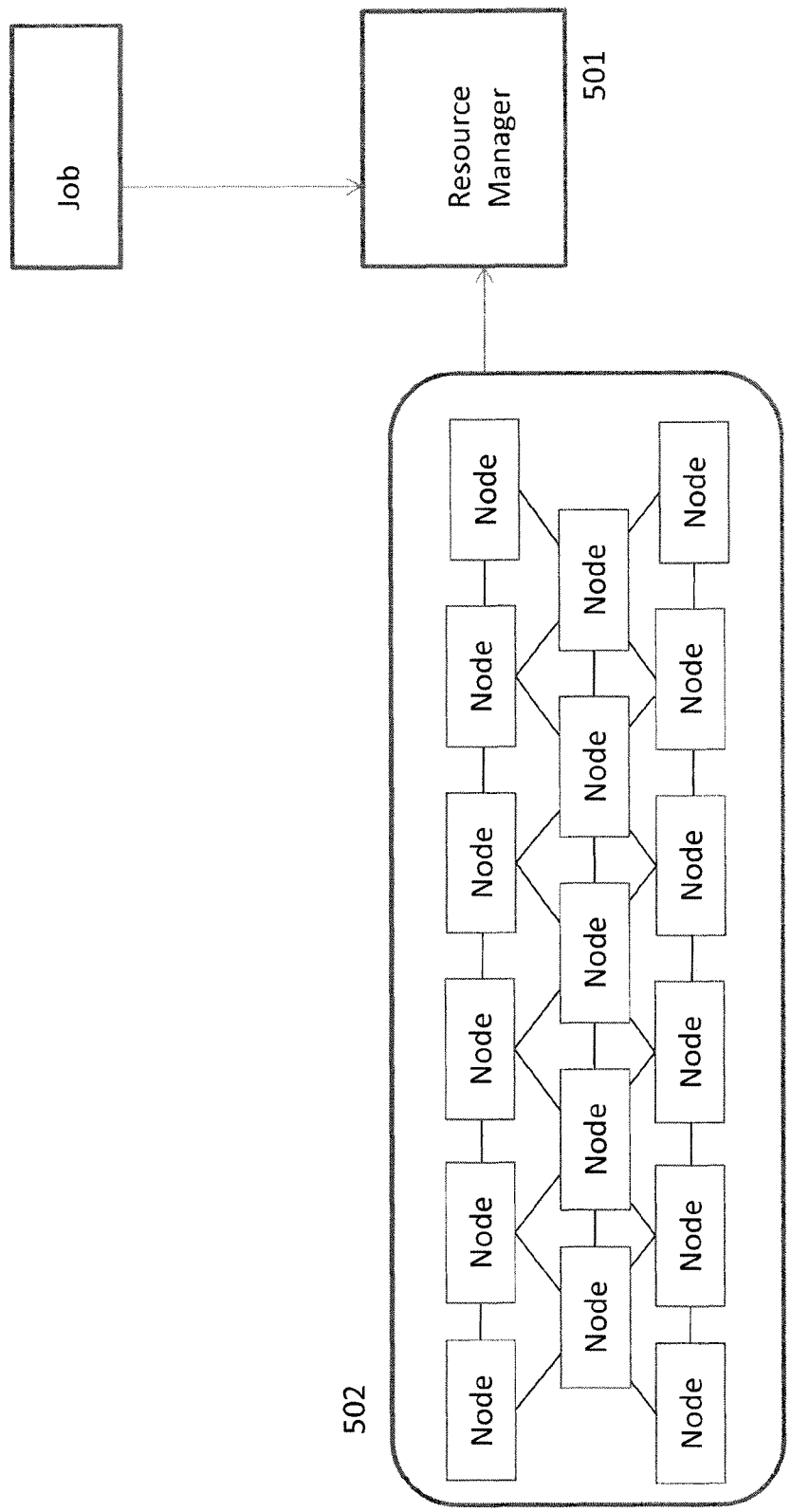
FIG. 1 is a schematic diagram of a computer cluster.
Figure 2:
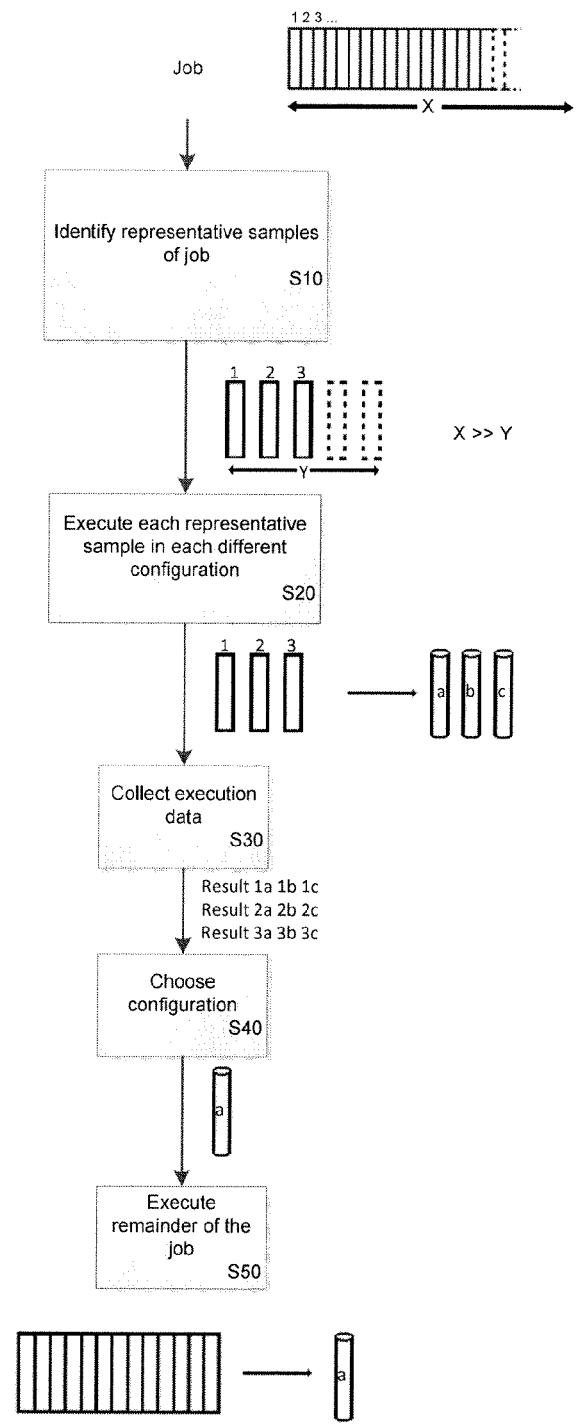
FIG. 2 is a schematic diagram of a general embodiment of a method according to invention embodiments.

FIG. 2 shows execution of a job shown with length X and made up of portions 1, 2, 3 etc. In step S10 representative samples of the job are identified and shown as portions 1, 2 and 3 etc with a length Y. X is much greater than Y so that the representative samples together form a fairly small percentage of the overall job length, and there may be a single representative sample. Each representative sample is executed in each of a number of different configurations of a computer system in step S20. The various configurations are shown as a, b and c and each may include some features which may vary energy use and have an attendant affect on the speed of execution which is dependent on the actual job being executed. In step S30 the execution data is collected. Thus the results are provided for representative sample 1 in each of configurations a, b and c and the same for samples 2 and 3. This allows the choice of a configuration which appears suitable.

As set out previously, the execution of the representative samples in step S20, collection of execution data in step S30 and choice of the configuration in step S40 may be carried out sequentially, or partially or completely in parallel so that the configuration may be chosen before all the results have been prepared. This might happen, for example, if a configuration that is suitable according to a pre-determined criterion or set of criteria is found before all the configurations are tested with all the representative samples. In that case, the experimental phase may continue only until a suitable configuration has been found and thus without the experimental phase necessarily completing. In step S50 the remainder of the job is executed using the chosen configuration. It should be noted that more than one configuration may be chosen to cater for example for coupled jobs.

Computer hardware on which applications are executed can have a number of different configuration options that will affect the energy use of the overall system. For example, most modern hardware allows changes to the cycle frequency and lowering the frequency reduces energy use. Modern hardware also allows changes to the computational state, for example turning off some of the integrated circuit to save energy. For the purposes of explanation we assume here that there are a small number (less than, say, between 5 and 15, may be 10) of discrete configurations and that each has different energy use characteristics and can affect computational performance differently. The resource manager has a list of these allowed configurations and the task in invention embodiments can be select the optimal configuration for each application as it is submitted.

An optimal configuration may be the one that has the lowest energy use with an acceptable impact on the time to complete execution of the job (usually this is that the job takes the shortest time, but there can also be tolerance to acceptable increases in execution time for specified savings in energy use set by either the resource manager or the user and in comparison to other configurations or default configuration).

As discussed above, resource managers cannot know from outside an application what the optimal settings are for energy efficiency. On the other hand, once a set of configuration options has been chosen, the energy performance characteristics of that execution of the application are essentially determined.

The core of some invention embodiments is to propose that resource managers actively determine the optimal settings for a particular submitted application and configuration options by experimenting to find the best solution using the submitted job. The resource manager runs small sections (representational samples, or probes) of the submitted job using all of the energy configuration settings.

Execution statistics are collected and analysed to find the optimal configuration for the particular job. This optimal setting is used to run the remainder (by far the largest part) of the submitted job. The representational sample may be around 1% of the total job. This process is preferably performed for every job submitted to a resource manager and every time one is submitted.

Experimenting to find the optimal configuration is known in the related art, but it has been applied at the level of the whole job: jobs are submitted and run to completion several times. One aspect of the novelty in the current application is that the experimentation takes place using partial execution of the submitted job. HPC invention embodiments may be viewed as resting on exploiting two observations: that HPC jobs execute for a long time and that HPC jobs repeat the same tasks, with the same performance characteristics, many times. Extracting these replications and using a few of these to find the optimal configuration is possible at little or no cost to the overall execution time.

The overall process in some embodiments is:
The resource manager receives a job to run. This job comprises one or more applications with initialisation files.
The resource manager uses one of the techniques described below to identify suitable probes. A probe is a small section of the overall job that is representative of the energy use characteristics of the overall job; hence it is also referred to herein as a representative sample.
The resource manager executes each of the probes matched with each of the allowed configurations and determines the best configuration to use for the remainder of the submitted job.

Probe execution usually advances the job execution, and so this process does not necessarily result in wasted compute resource or increase in the time to the job end.

Alternative Representative Samples

The following sections give more detail of representative samples that may be used in different circumstances and the way they are identified.

Alternative 1: Sub-job Arrays

HPC jobs can be submitted in large groups, running the same executable with different input values. The reason for doing this is to investigate a range of possible solutions: in weather forecasting to test sensitivity to small changes of input conditions, in engineering to find the optimal combination of a set of parameters. In these groups or "sub-job arrays" the same executable is run many times with almost identical initial values. We therefore can safely assume that the performance characteristics for all the sub jobs submitted in an array will be very similar as algorithm choices and problem sizes will be the same. As a result we expect that the execution time of each member job will be very similar. If a sub-job array has a reasonable number of members, say 50 to 150, then the resource manager can use experimental execution of some of the members of the array to find the optimal setting for that particular executable and configuration. That is, it can vary the settings for the first few of the member jobs (the probes) to find the most energy efficient configuration and apply that to all the remaining member jobs.

Figure 3:
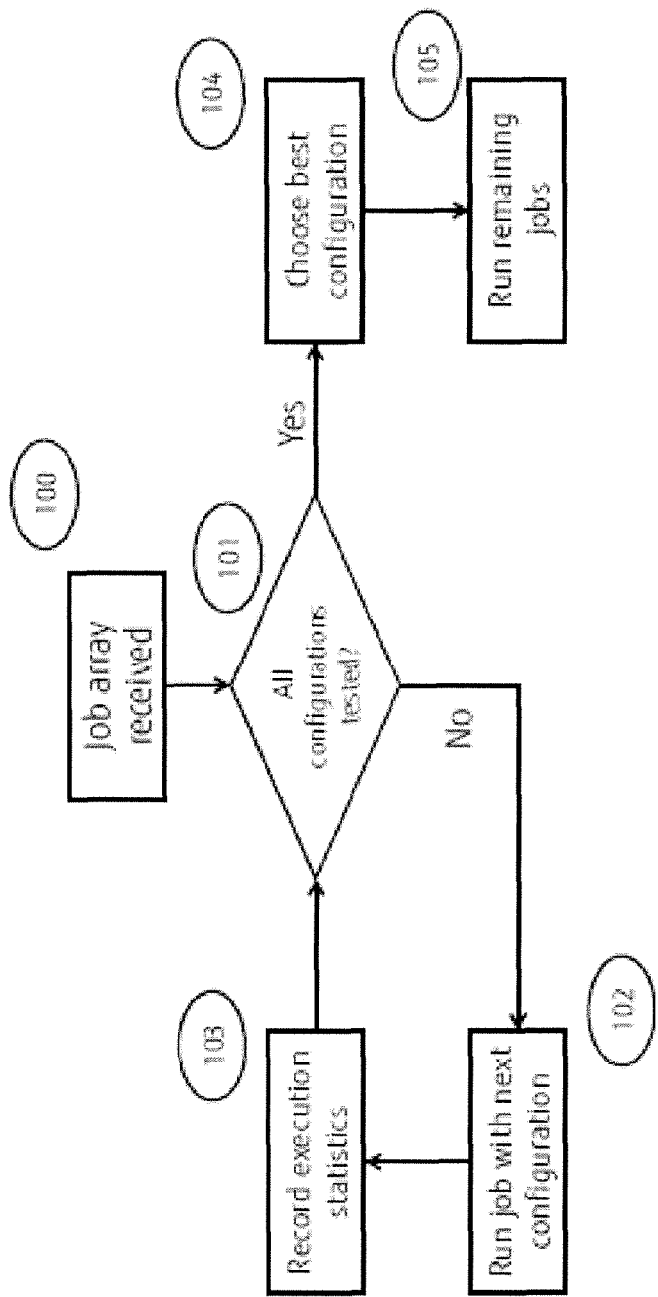
FIG. 3 is a flow chart of processing of a sub-job array according to invention embodiments.

FIG. 3 illustrates this process. A job is received and the resource manager detects that it is a sub-job array (100) (often there are special constructs in the job submission language to indicate arrays, alternatively the submission script can be parsed and repeated calls of the same executable identified). As described above, the resource manager holds a list of machine configurations that trade performance for energy use. The resource manager iterates through this list submitting each member job for each of the machine configurations (101 and 102). At the end of execution the execution statistics are recorded (103). Following the testing of all configurations through probe execution, the resource manager analyses the results to identify the optimal machine configuration for the sub-job array, for example the one that has the least energy use close to the shortest execution time (104). The resource manager then submits the remaining member jobs (105) using the identified optimal configuration.

Algorithm 2: Coupled or Interchanging Sub Jobs

Some HPC jobs couple two applications together, the output of one becoming input values for the other. These are often coupled as part of an iterative or time marching scheme where the execution of the coupled applications alternates. That is, given two coupled applications named A and B, execution of a coupled job will involve repeated execution of these two applications in, say, the order ABABABABA . . . . Once a Resource Manger has detected that a submitted job involves coupled applications, experimental execution is possible to determine the optimal system configuration for the members of the coupled application (so that executions of A and B become probes). Note that applications A and B are different, so different settings of each may be required for optimal execution. However, as the coupled applications solve a fixed problem, many of the performance related characteristics, such as problem size and algorithm choice, will remain constant, so the results of the initial experiment will remain valid. In some cases, though, as one or both of the coupled applications develops through execution, the performance characteristics change (with the physical properties of the system being modelled). This means that the resource manager needs to monitor execution time and energy use throughout execution and if any of the member applications deviate from the expected values (obtained during the initial experimentation phase), the resource manager must rerun the experimentation phase to determine the current best value set.

During an experimental phase the resource manager continues to execute the coupled applications (sub jobs or member jobs) in the sequence requested by the user, the only changes made are to the system configuration settings, which are varied as the member jobs are executed until sufficient information has been gathered about the member applications to find the optimal settings.

For illustration purposes we have considered a coupled job to be alternations of two sub jobs (A and B), however it is obvious that this scheme can be extended to arbitrarily large number of sub jobs running in sequence (e.g. A,B,C,D, A,B,C,D, A,B,C,D . . . or in an order that varies e.g. AABBCDACDBBB). The experimental phase is still valid.

Figure 4:
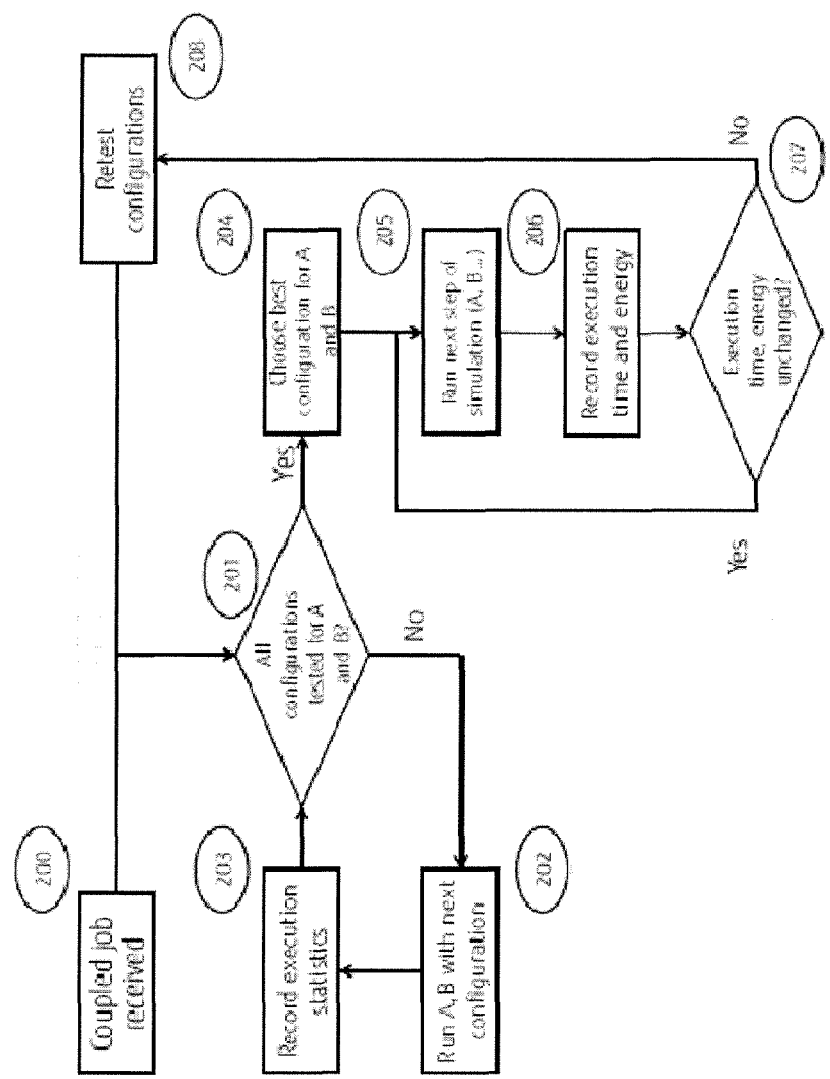
FIG. 4 is a flow diagram of processing of a coupled job of interchanging sub jobs according to invention embodiments.

FIG. 4 illustrates the process for coupled applications. A job is received and identified by the resource manager as coupled applications (200) (this may be from constructs in the job description language such as a looping structure). The resource manager begins execution of the job in experimental mode using the sub jobs as probes (201). Each sub job is tested with each energy configuration and the performance data recorded by the resource manager (203). Once all possible configurations have been tested for a sub-job type, the optimal configuration is selected for that sub-job type (204) and the remaining executions are run with that configuration (205). The resource data monitors performance data (206) and if there are deviations from the expected optimal values (beyond a set tolerance) (207) the experimental mode is re-entered for that job sub-type (208).

Alternative 3: Iteration Tests—Cyclical Job

Almost all HPC applications have a well-defined cyclic nature, they repeat the same (or similar) computations for each of a large number of steps (e.g. through time) or they repeat a series of computations whilst refining a result to higher accuracy.

There are a number of ways that a resource manager can identify cycles within an application. These include:

- Identification by the programmer or user of the start and end of a cycle that is signalled back to the resource manager.
- Inference by the resource manager from repeated sequence of calls to library-provided methods such as MPI communication primitives (e.g. a global wait or global sum often occurs towards the end of a cycle)
- Inference by the resource manager by analysing the power use profile of the application which will change during a cycle as different resources are used (e.g. a cycle may include a communication phase increasing the network power use)
- Inference by the resource manager from the usage levels of resources which will change during a cycle e.g. CPU use may decrease while I/O increases as results of a cycle are saved to non-volatile storage.

An application usually has a large number of execution cycles and so once the resource manager can reliably identify a cycle it can apply the Experimental technique to find the optimal energy configuration for the hardware. Execution cycles become probes. That is, the resource manager can change the energy configuration for the application; watch the execution run through a number of cycles, record the execution statistics. Once this has been done for all the configurations in the resource manager's list, the optimal configuration can be applied for the remainder of the execution of the application. As the application computation progresses the characteristics may change, so the resource manager monitors performance and re-optimises if necessary.

Note that the execution time of cycles may be short and that the granularity of resource manager actions (e.g. the response time to energy configuration changes) may be much larger than a single cycle. Therefore, individual experiments with a single configuration must be run over a number of cycles (application and computer system dependant) to provide accurate data.

Figure 5:
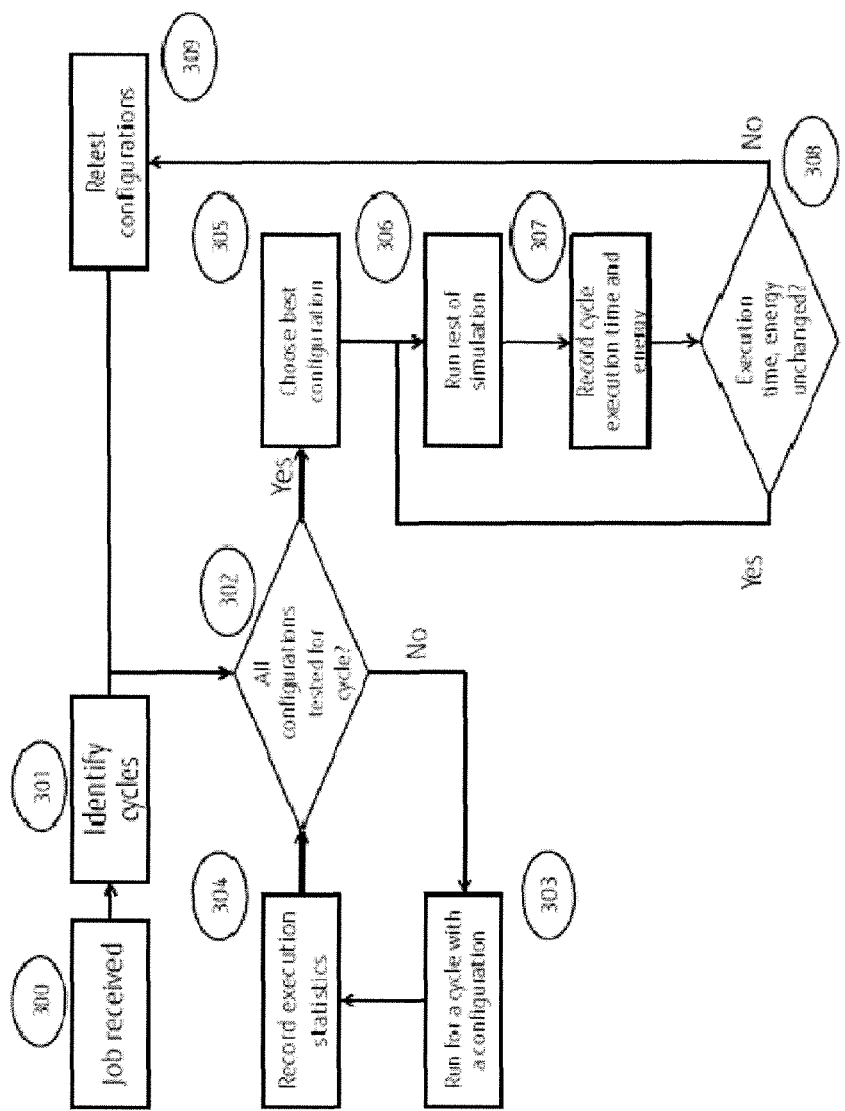
FIG. 5 is a flow diagram of processing of a cyclical job according to invention embodiments.

FIG. 5 illustrates this process. A job is received and identified by the resource manager as a monolithic executable (300) (this may be from the lack of constructs of the Job description language that could identify it as coupled or as a sub-job array). The resource manager starts execution of the job using a default configuration and then observes the execution to identify cycles using one of the techniques discussed above (301). Once cycles can be reliably identified, each is tested with each energy configuration (302, 303) and the performance data recorded by the resource manager (304). Once all possible configurations have been tested, the optimal configuration is selected (305) and the remaining cycles are run with that configuration (306). The resource data monitors performance data (307) and if there are deviations from the expected optimal values (beyond a set tolerance) (308) the experimental mode is re-entered (309).

Alternative 4: Sample Executables

Users can help the resource manager to run efficient experimentation phases by supplying one or more short, low resource-use "probe" versions of the main application that are guaranteed to have the same energy use characteristics as the main executable. For example, the supplied probe executable could be configured to run a small number of cycles. The resource manager can use these probes to find the optimal configuration before running the main application.

Figure 6:
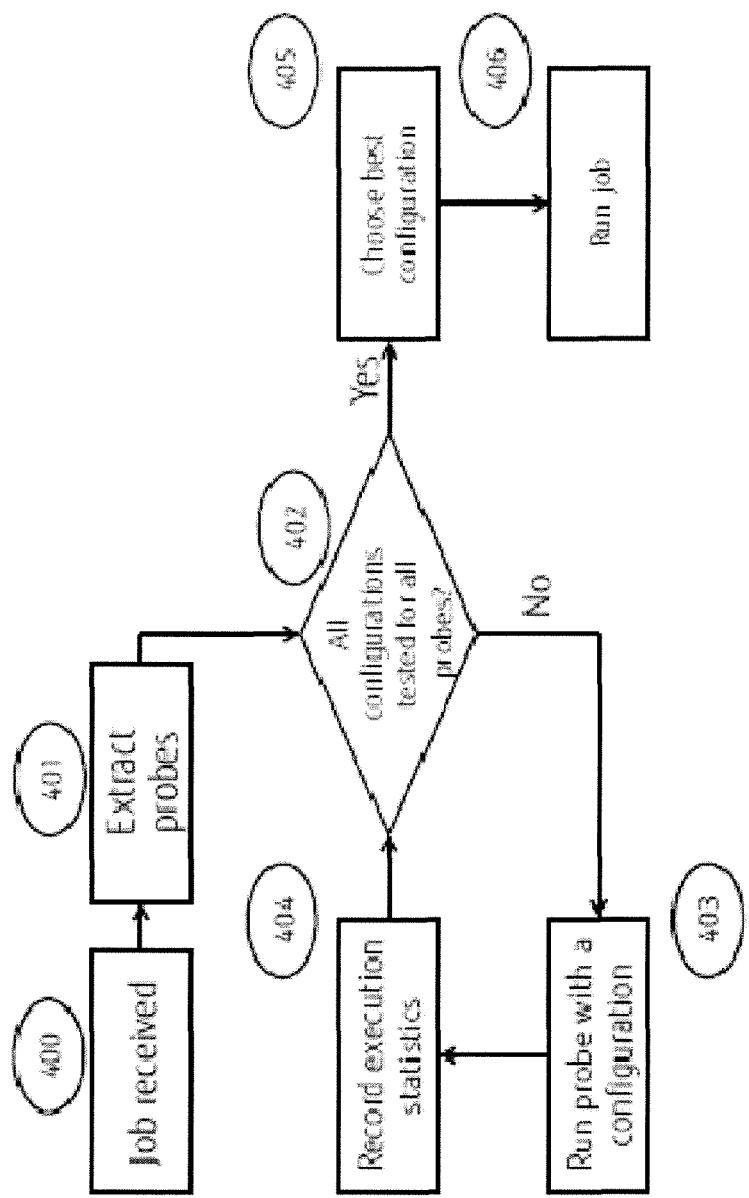
FIG. 6 is a flow diagram of processing of a job with pre-identified probes.

FIG. 6 illustrates this process. A job is received and the resource manager detects that it has probes identified by the user (400). The resource manager extracts the probes (401). As described above, the resource manager holds a list of machine configurations that trade performance for energy use. The resource manager iterates through this list executing each probe for each of the machine configurations (402 and 403). At the end of execution the execution statistics are recorded (404). The resource manager then identifies the optimal machine configuration, for example the one that has the least energy use close to the shortest execution time (405). The resource manager then executes the remaining job using the identified optimal configuration (406).

System Configuration

Figure 7:
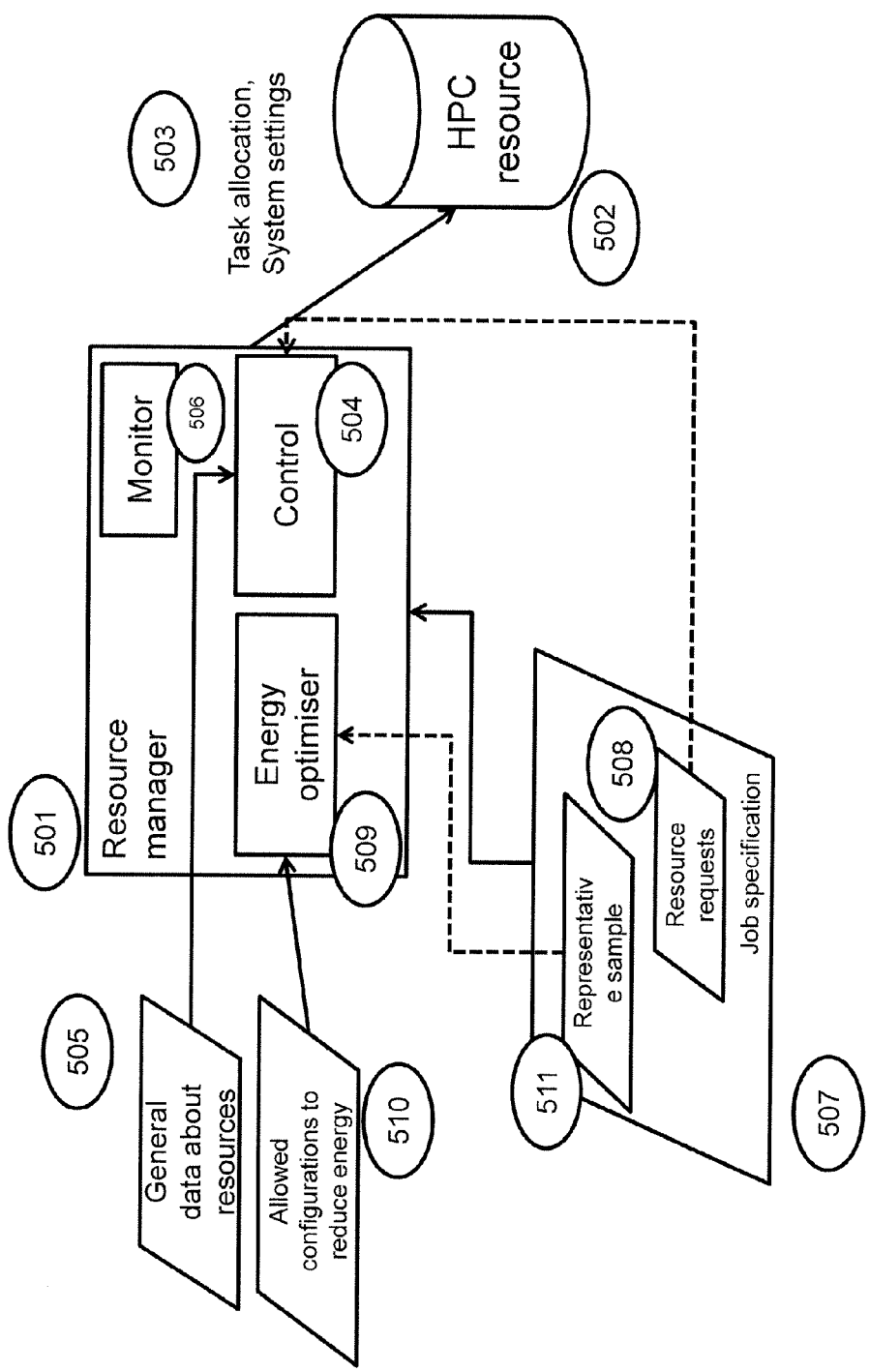
FIG. 7 is a schematic diagram of a resource manager.

FIG. 7 shows an illustrative system configuration where a resource manager (501) is in charge of allocating resources to a HPC computer (502). The resource manager can assign tasks (parts of a job) to the HPC resource and it can also control aspects of the operation of the resources, such as the voltage and frequency of the CPUs (503). The parts of interest of the resource manager are the control (504) which assigns jobs to computing resources and sets the configurations of the computing resources, the monitor (506) which collects execution data including the speed of execution and energy used in each configuration during execution of the representative samples and the energy optimiser (509) which is the main new component of the invention. General data about resources (505) is input into the control, as well as resource requests (508). The energy optimiser (509) identifies representative samples of the job which are shown as part 511 and stores allowed configurations of the HPC resource (510) which relate to energy use.

The optimiser identifies the representative samples and controls the process of finding the best configuration. It does this by receiving data from the monitor, about energy use and any further data used to identify samples (when necessary) and to detect the start and end of a sample. It formulates requests for configuration changes that are enacted by the control. So the optimiser controls the whole process adaptive configuration using the monitor and control to interface with the computer system.

The resource manager sends the task allocation and system settings (503) to the HPC resource.

Thus the Energy Optimiser (509) that is initialised with a list of configurations of the HPC resources combines this information with nomination or identification of probes (511) to drive the optimisation experimentation process.

The energy optimiser (509) suggests an optimal energy configuration to the Control (504). This configuration is determined by analysing the execution statistics rescored during the experimental execution of a job's probes. Analysis could be finding the configuration for which a probe uses the least energy.

Figure 8:
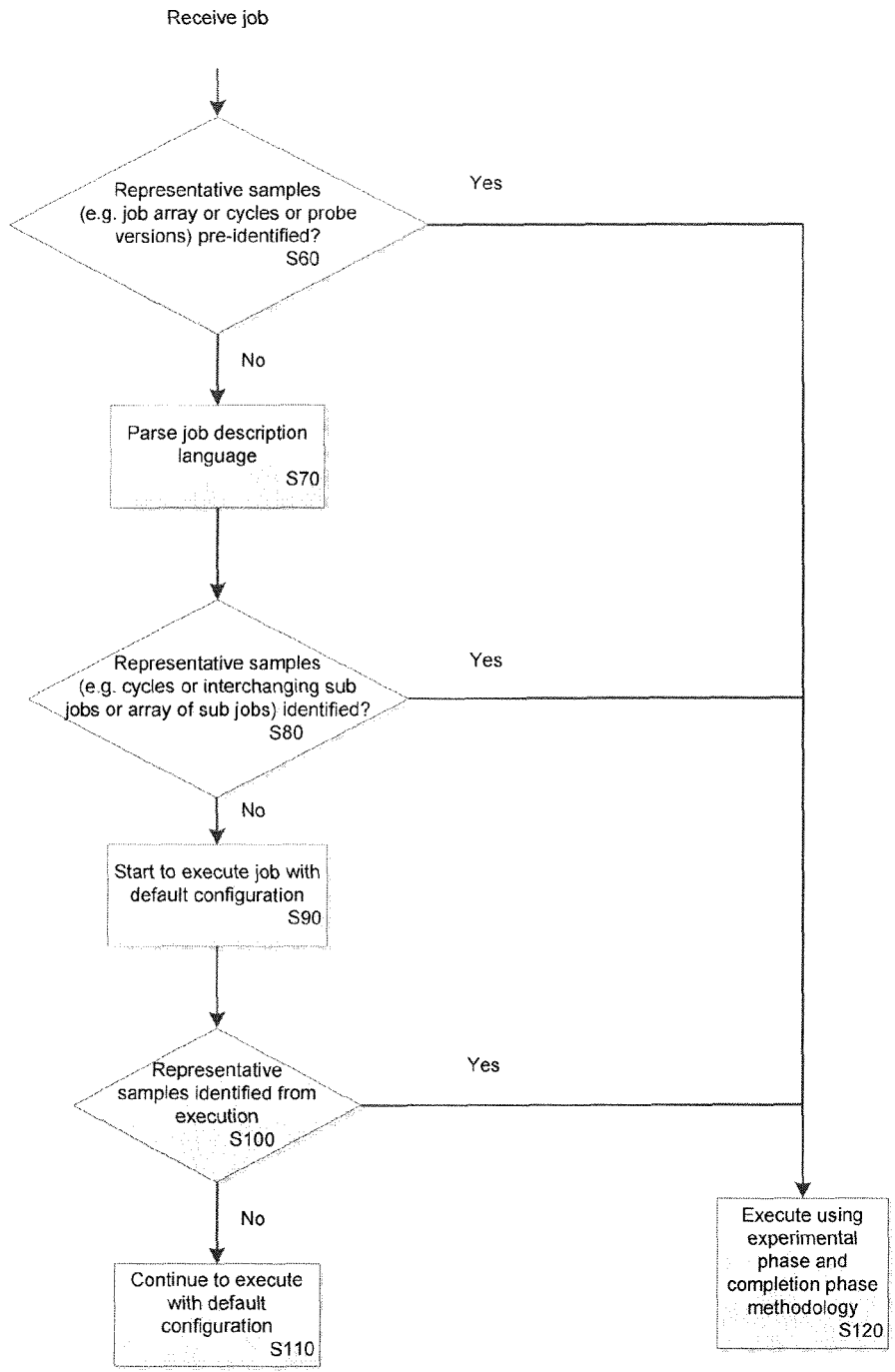
FIG. 8 is a flow chart showing identification of representative samples in overview.

FIG. 8 shows one embodiment of the method in which representative samples may be identified if they belong to one of the categories of alternatives listed above, or another category which allows the same methods of identification. In step S60 there is a first check whether representative samples are pre-identified, for example in the form of a sub-job array or cycles or probe versions. Pre-identification can be of any type of representative sample and may be entered by the user of based on job description constructs.

If the representative samples are pre-identified, the method carries on with the experimental phase and completion phase methodology in step S120. If there is no pre-identification, the job description language is parsed in step S70 and if representative samples are identified by parsing in step S80 the experimental phase and completion phase methodology is used in step S120. Parsing can be used to identify many different types of representative samples.

If representative samples have not yet been identified after the parsing stage, the job starts to execute with a default configuration in step S90 and representative samples may be identified from the execution in step S100 in which case the experimental and completion phase methodology is followed in step S120. Otherwise, the job continues to execute with the default configuration.

Summary of Invention Embodiments

Modern high performance computer (HPC) systems and other computer systems use large amounts of energy, which needs to be reduced for cost and social responsibility reasons. The component computers of HPC clusters have the ability to reduce their energy consumption, but at the cost of reduced performance for some, but not all, types of jobs. A HPC cluster resource manager can save energy while maintaining performance if it can identify those jobs that will not lose performance (or will have an acceptable performance loss) when executed in energy-saving mode. Invention embodiments identify suitable jobs by proposing that the resource manager tests short sections (probes) of every submitted job against possible configurations and selects the optimal configuration for a particular job. HPC and other computer system jobs have regular execution patterns so probes exist. The invention embodiments identify a number of different probe types.

The invention claimed is:

1. A method of executing a job submitted for execution in a computer system, the job comprising one or more executable applications in the computer system and the computer system having a plurality of different allowed hardware configurations, the method comprising:
   receiving the job submitted for execution;
   identifying one or more representative samples of the job, the one or more representative samples being a part of the job;
   executing the job in two phases, an experimental phase in which the job is partially executed and a completion phase in which a remainder of the job is executed, where in the experimental phase, each representative sample is executed with each different allowed hardware configuration of the computer system;
   collecting execution data including speed of execution and energy used in each hardware configuration during execution of the one or more representative samples and selecting a suitable hardware configuration for the remainder of the submitted job by taking speed of execution and energy use into account;
   executing the remainder of the job in the completion phase with the suitable hardware configuration.

2. A method according to claim 1, wherein the job is received in a form of a sub-job array of a same executable with different inputs and the one or more representative samples are identified as a selection only of the sub-job array.

3. A method according to claim 1, wherein the job is received in a form of a linked sequence of repeating interchanging sub jobs, in which each sub job appears more than once and the one or more representative samples are initial sub jobs in the sequence.

4. A method according to claim 3, wherein each of the sub jobs is an application, and two or more suitable hardware configurations are selected, one for each application.

5. A method according to claim 1, wherein the job is cyclical and cycles are recognized within the job and one or more cycles of the job are identified as the representative sample.

6. A method according to claim 5, wherein the one or more representative samples are identified by checking for pre-identification in the job; provided identification is unsuccessful, parsing a job description language and provided identification is still unsuccessful, attempting identification during execution.

7. A method according to claim 1, wherein the job includes a main job and sub-jobs, the sub-jobs being in a form of one or more probe versions of the main job with energy use characteristics corresponding to the main job; and the sub-jobs are identified as the one or more representative samples executed in the experimental phase, with the main job being executed in the completion phase.

8. A method according to claim 1, wherein each hardware configuration of the computer system has different energy use characteristics and affects computational performance differently, and a suitable hardware configuration is a hardware configuration with a lowest energy use and an acceptable time to complete execution.

9. A method according to claim 1, wherein the different hardware configurations include variations in one or more of the following in the computer system: applied voltage, cycle frequency, and amount of activated computing resource.

10. A method according to claim 1, wherein one of a job language is parsed when the job is received to identify the one or more representative samples from the description job language and the job execution starts before the experimental phase in a default hardware configuration phase used to identify the one or more representative samples.

11. A method according to claim 1, wherein the one or more representative samples form 3% or less of the total job, preferably 1% or less.

12. A method according to claim 1, wherein the experimental phase and the completion phase are performed each time a job is submitted and preferably further comprising collecting subsequent execution data during the completion phase and returning to one of the experimental phase and an adapted experimental phase, if subsequent execution data indicates that the suitable hardware configuration is no longer appropriate.

13. A method according to claim 1, wherein the experimental phase continues until one of all the hardware configurations have been tested and a suitable hardware configuration has been found.

14. A method according to claim 1, wherein the computer system comprises a computer cluster and the job includes at least one application which is split into a number of tasks, and the tasks are allocated to nodes of the computer cluster by a resource manager.

15. A resource manager managing computing resources in a computer system to execute computing jobs submitted for execution, each job comprising one or more executable applications, wherein the resource manager comprises:
a memory and a processor implementing:
a control module arranged to assign jobs to resources and to control operation of the computer system to produce different hardware configurations thereof, the control module also being arranged to identify one or more representative samples of the job, the one or more representative samples being a part of the job and to allow execution of a job in two phases, an experimental phase in which the job is partially executed and a completion phase in which a remainder of the job is executed each representative sample is executed with each different allowed hardware configuration of the computer system;
an energy optimizer arranged to identify one or more representative samples of the job, the one or more representative samples being a part of the job, the energy optimizer also being arranged to store the different hardware configurations of the computer system, and to request the control module to assign the job to resources in the computer system to allow execution of the one or more representative samples in the experimental phase, the one or more representative samples being executed each with a different hardware configuration of the computer system; and
a monitoring module arranged to collect execution data including speed of execution and energy used in each hardware configuration during execution of the one or more representative samples,
wherein the energy optimizer is arranged to select a suitable hardware configuration for the job taking speed of execution and energy use into account, and to request the control module to execute a remainder of the submitted job in the completion phase with the suitable hardware configuration.

16. A high performance computer (HPC) system comprising nodes coupled together by an interconnect to form a cluster and a resource manager managing computing resources in a computer system to execute computing jobs submitted for execution, each job comprising one or more executable applications wherein the resource manager comprises:
a memory and a processor implementing:
a control module arranged to assign jobs to resources and to control operation of the computer system to produce different hardware configurations thereof, the control module also being arranged to identify one or more representative samples of the job, the one or more representative samples being a part of the job and to allow execution of a job in two phases, an experimental phase in which the job is partially executed and a completion phase in which a remainder of the job is executed; each representative sample is executed with each different allowed hardware configuration of the computer system
an energy optimizer arranged to identify one or more representative samples of the job, the one or more representative samples being a part of the job, the energy optimizer also being arranged to store the different hardware configurations of the computer system, and to request the control module to assign the job to resources in the computer system to allow execution of the one or more representative samples in the experimental phase, the one or more representative samples being executed each with a different hardware configuration of the computer system; and
a monitoring module arranged to collect execution data including speed of execution and energy used in each hardware configuration during execution of the one or more representative samples; and
wherein the energy optimizer is arranged to select a suitable hardware configuration for the job taking speed of execution and energy use into account and to request the control module to execute a remainder of the submitted job in the completion phase with the suitable hardware configuration.

\* \* \* \* \*